Figure 1:
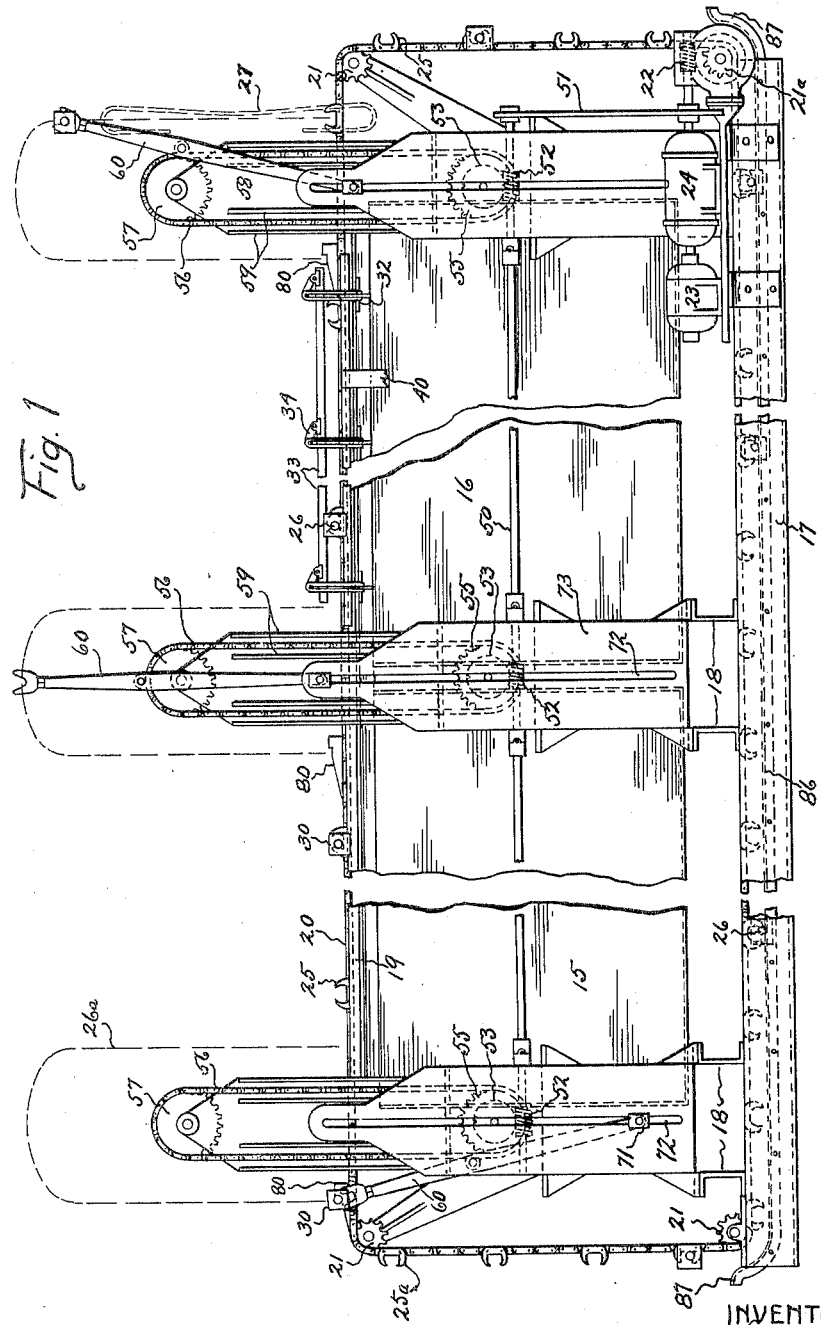

Feb. 23, 1932. A. H. HANNON 1,846,053
ARTICLE HANDLING MACHINE
Filed June 15, 1928 3 Sheets-Sheet 2
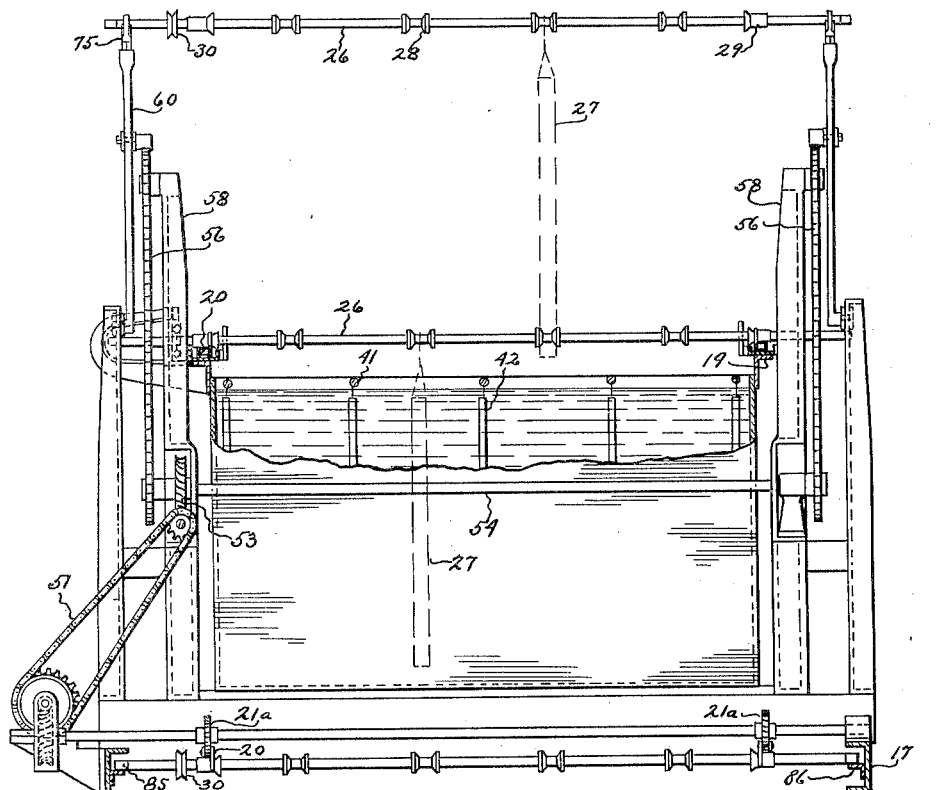
Fig. 2
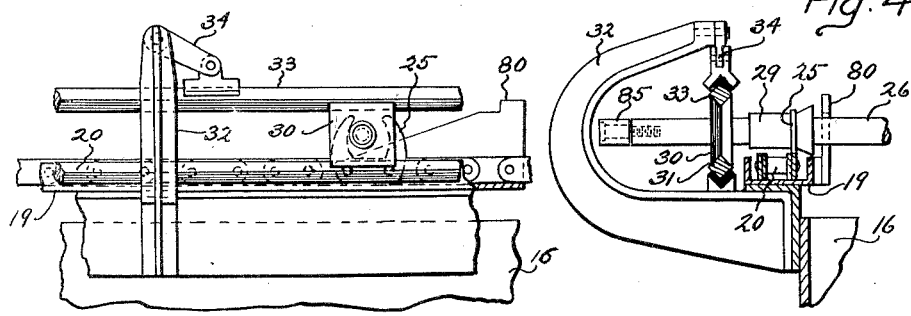
Fig. 3
Fig. 4
INVENTOR
Albert H. Hannon
BY
Underwood & Hardesty
ATTORNEYS

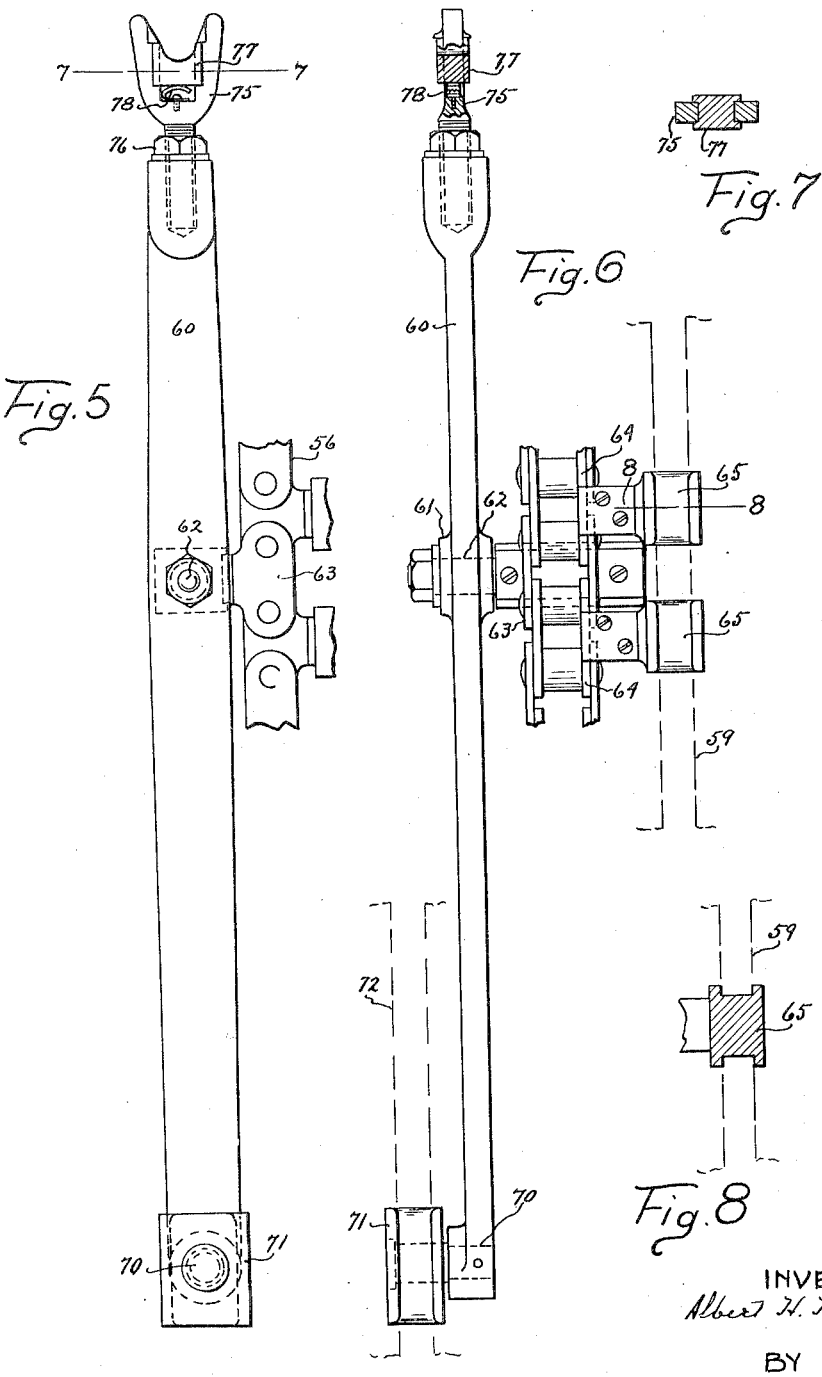

Patented Feb. 23, 1932

1,846,053

UNITED STATES PATENT OFFICE

ALBERT H. HANNON, OF DETROIT, MICHIGAN, ASSIGNOR TO FREDERIC B. STEVENS, INC., OF DETROIT, MICHIGAN, A CORPORATION OF MICHIGAN

ARTICLE HANDLING MACHINE

Application filed June 15, 1928. Serial No. 285,567.

The present invention relates to machines for handling and treating articles, and more especially to electro-plating equipment.

In devices of the type indicated, it is not uncommon to treat the articles in a series of steps including submerging them in liquid in a series of tanks and moving them through the liquid from one end of a tank to the other, then to transfer them to the next tank. In electroplating processes such steps may be one or more of electroplating with intermediate steps of washing.

Among the objects of the present invention is to provide means for handling the articles during such processes.

Another object is a more efficient means for transferring the articles from one tank to the next.

Still another object is handling and transfer means which will greatly decrease the space required for the installation of machines of a given capacity.

Further objects will readily occur to those skilled in the art upon reference to the following description and the accompanying drawings, in which Figure 1 is a side elevation of an electroplating machine involving the present invention.

Figure 2 is an end elevation of the same and Figures 3 to 8 inclusive show details of construction thereof.

In the drawings, the machine is illustrated as comprising a plurality of tanks 15 and 16, in the present instance two, but it should be understood that the number is dependent solely on the number of operations desired. These tanks are mounted in a suitable framework consisting of the longitudinal channels 17 having thereon cross members 18 supporting tanks 15 and 16 and also serving to support certain other parts to be described.

Carried preferably by the top lateral edges of the tanks are tracks or guides 19 for supporting and guiding conveyor chains 20 which extend the full length of the series of tanks and down the ends to return under the bottom, passing over suitably supported pairs of sprockets 21, one pair of which 21a is driven by means of the worm drive 22 from a suitable motor 23, preferably through a reducing gearing unit 24.

The chain conveyors 20 are provided at suitable intervals with pockets 25—which carry along over the tanks work supporting rods 26 from which are suspended the articles to be treated indicated at 27. Suitable spacers 28 are secured to the rods 26 for the purpose of properly locating the articles in the tanks, and near each end is an insulating sleeve 29 for preventing electrical contact between the rods and the conveyor.

Beyond the conveyors the rods project for a short distance and each end is provided with a preferably square contact shoe 30 having a peripheral V-shaped groove, adapted to be supported on a square bus bar 31 carried by brackets 32 and suitably insulated therefrom. A second bus bar 33 contacts with the upper side of each shoe 30 and is carried by swinging arms 34 hinged to the upper ends of the same brackets 32, the latter being U-shaped so as to permit passage of the extremity of rod 26. It will be understood of course that the bus bars 31 and 33 will be connected to one pole of a suitable source of current, a lead for this purpose being indicated at 40.

Within one or more of the tanks will be mounted longitudinal rods 41, suitably insulated and adapted to be connected to the other pole of the source of current supply, and upon these will be hung the anodes 42.

In machines of this character adapted for continuous operation, the conveyors 20 are operated continuously at slow speed, the work pieces being placed thereon at one end of the series of tanks and removed therefrom at the other end. Means must therefore be provided for transferring the work from the rear end of one tank to the front end of the next and for similar means for putting the work in the tank and removing it from the last.

Means for this purpose is provided in the present machine and three of such units are shown, though it must be understood that there may be more as the number of tanks is increased. There must be one unit at each tank division and one at each end of the series.

In Fig. 1 the machine is shown as having a longitudinal shaft 50 rotatable from motor 23 through chain drive 51. This shaft through worms 52 drives worm gears 53 mounted on cross shafts 54, each having a sprocket 55 at each end. The sprockets 55 drive vertically arranged chains 56 passing over upper sprockets 57, preferably mounted in any suitable manner for vertical adjustment. It is preferred to support sprockets 57 on vertical plates 58 or other suitable elements provided with vertical guide ways 59.

Each of the chains 56 carries rotatably mounted on its outer edge a lifter member 60 which is shown in detail in Figs. 5 to 8, and which is adapted to pick a rod 26 from one of the pockets 25, lift it vertically carrying the attached articles 27 with it, move the rod forward and lower it vertically into one of the pockets 25 with the articles in the next tank in series.

These lifters 60 are provided near the middle with bearing bosses 61 for the passage of the pins 62 which latter are mounted on special link 63 for the chains 56. On the opposite edge of the chain 56 is a pair of other special links 64 each carrying a slide member 65 adapted to coact with guide portions 59 so as to prevent lateral movement of the chain.

The lower end of lifter 60 carries a pin 70 on which is rotatably mounted a guide block 71 which cooperates with a suitable guide slot 72 in a guide plate 73 mounted on base members 18 outside of chains 56 and their sprockets.

The upper end of lifter 60 comprises preferably a threaded socket in which is screwed the shank of a small forked or yoke member 75, fixed in adjustable position by a nut 76. The inner surfaces of the yoke 75 are preferably finished to form slides for a suitable block 77 which may be hardened to resist wear and which is backed by a spring 78 adapted to absorb the shocks occasioned by the picking up of the rods 26.

When the chains 56 are in motion, the pins 62 of the lifters are of course carried down under the sprockets 55 and move the lifters 60 down to their lowest position. In passing under the sprockets 55, the lifters change their angle of inclination so as to have their upper ends alongside of the preceding tank of the series. As the pins 70 pass over the sprockets 57 the reverse change takes place, and due to the guide 59 and slot 72 the up and down movement of the lifters is such that the yoke 75 moves in straight lines. This is very desirable in order to prevent swinging of the work pieces.

As a further safeguard against swinging of the work, inclined skid blocks 80 are placed near the conveyor 20 in such position that the rods 26 are lifted out of pockets 25 and come temporarily to rest before being picked up by the lifters 60.

It is of course obvious that the timing of chains 20 and 56 may be regulated in any manner found proper and by changing the length of chains 56 and lifters 60, provision may be made for the treatment of very long articles.

Further as the upper end of the lifters need travel but a short distance lengthwise of the tank series, the tanks may be placed close together to save over all length.

In operation, the articles to be treated will be placed on the several rods 26 and these spaced one at a time on the conveyor 20 (at the left of Fig. 1) in the pockets 25, in about the position of the pocket 25a. The rod is carried then up to and on the first skid block 80 and is picked up by the lifter 60 and carried through the path indicated by line 26a and deposited in one of the pockets 25 which may be either the same pocket or another ahead or behind, depending on the relative speed of chains 20 and 56. The rod is then carried lengthwise of the tank 15 until it is shoved up on the second block 80 and the transfer made to tank 16.

At the end of tank 16 the rod and articles are lifted out and the articles removed from the rod, which is then replaced in one of the pockets 25 and returned by the conveyor 20 under the tanks to the loading of the series.

In order to facilitate this return, rollers 85 may be placed on each end of rods 26 and the channel base members 17 may be provided with a track 86 upon which the rods are supported while being pulled along by the pocket elements. It is preferred also to turn up the ends of the track 86 as shown at 87 to permit spilling the rods.

Now having described the invention and the preferred form of embodiment thereof, it is to be understood that the said invention is to be limited, not to the specific details herein set forth, but, only by the scope of the claims which follow.

I claim:—

1. In machines including a plurality of tanks in which articles are transferred from one tank to the next, transfer means comprising a vertically arranged chain conveyor and sprocket wheels therefor, a work lifter on said chain comprising an elongated lever member pivoted on said chain at its fulcrum, a fork on the upper end of said lever adapted to engage the work, a guide block on the lower end of said lever, and a vertical guide for said block in alignment with the axes of said sprockets.

2. In machines including a plurality of tanks in which articles are transferred from one tank to the next, transfer means comprising a vertically arranged chain conveyor and sprocket wheels therefor, a work lifter on said chain comprising an elongated lever member pivoted on said chain at its fulcrum, vertically arranged guides for said fulcrum, a fork on the upper end of said lever adapted to engage the work, a guide block on the lower end of said lever, and a vertical guide for said block in alignment with the axes of said sprockets.

3. In machines including a plurality of tanks in which articles are transferred from one tank to the next, transfer means comprising a vertically arranged chain conveyor and sprocket wheels therefor, a work lifter on said chain comprising an elongated lever member pivoted on said chain at its fulcrum, a fork longitudinally adjustably mounted on the upper end of said lever adapted to engage the work, a guide block on the lower end of said lever, and a vertical guide for said block in alignment with the axes of said sprockets.

4. In machines including a plurality of tanks in which articles are transferred from one tank to the next, transfer means comprising a vertically arranged chain conveyor and sprocket wheels therefor, a work lifter on said chain comprising an elongated lever member pivoted on said chain at its fulcrum, a fork on the upper end of said lever provided with yielding means adapted to engage the work, a guide block on the lower end of said lever, and a vertical guide for said block in alignment with the axes of said sprockets.

5. In machines including a plurality of tanks in which articles are transferred from one tank to the next, transfer means comprising a vertically arranged chain conveyor and sprocket wheels therefor, a work lifter on said chain comprising an elongated lever member pivoted on said chain at its fulcrum, vertically arranged guides for said fulcrum, a fork longitudinally adjustably mounted on the upper end of said lever adapted to engage the work, a guide block on the lower end of said lever, and a vertical guide for said block in alignment with the axes of said sprockets.

6. In machines including a plurality of tanks in which articles are transferred from one tank to the next, transfer means comprising a vertically arranged chain conveyor and sprocket wheels therefor, a work lifter on said chain comprising an elongated lever member pivoted on said chain at its fulcrum vertically arranged guides for said fulcrum, a fork on the upper end of said lever provided with yielding means adapted to engage the work, a guide block on the lower end of said lever, and a vertical guide for said block in alignment with the axes of said sprockets.

7. In article handling machines having a series of separate tanks, a conveyor for moving the articles lengthwise of the tanks, a vertically arranged pickup and transfer means for transferring the articles from one tank to the next, said transfer means including a vertically arranged endless movable conveyor, and pickup means connected to said conveyor means and adapted to be moved thereby to pick up an article from said lengthwise conveyor, to lift it vertically to a distance above said tanks, to move it forward and to lower it vertically upon the said lengthwise conveyor over the next tank, said pickup means including an elongated rod having one end mounted so as to move vertically only, having a portion so located as to pick up, forwardly move, and lower the articles, and having a pivotal connection to said vertically arranged conveyor.

8. In article handling machines having a series of separate tanks, a conveyor for moving the articles lengthwise of the tanks, a vertically arranged pickup and transfer means for transferring the articles from one tank to the next, said transfer means including a vertically arranged endless movable conveyor, and pickup means connected to said conveyor means and adapted to be moved thereby to pick up an article from said lengthwise conveyor, to lift it vertically to a distance above said tanks, to move it forward and to lower it vertically upon the said lengthwise conveyor over the next tank, said pickup means including an elongated rod having one end mounted so as to move vertically only, having a portion so located as to pick up, forwardly move, and lower the articles, and having an intermediate pivotal connection to said vertically arranged conveyor.

9. In article handling machines having a series of separate tanks, a conveyor for moving the articles lengthwise of the tanks, a vertically arranged pickup and transfer means for transferring the articles from one tank to the next, said transfer means including a vertically arranged endless movable conveyor, and pickup means connected to said conveyor means and adapted to be moved thereby to pick up an article from said lengthwise conveyor, to lift it vertically to a distance above said tanks, to move it forward and to lower it vertically upon the said lengthwise conveyor over the next tank, said pickup means including an elongated rod having one end mounted so as to move vertically only, having a portion so located as to pick up, forwardly move, and lower the articles, and having a pivotal connection to said vertically arranged conveyor, the mounting of the first mentioned end including a vertically slotted stationary guide member in which said end is disposed to move.

10. In article handling machines having a series of separate tanks, a conveyor for moving the articles lengthwise of the tanks, a vertically arranged pickup and transfer means for transferring the articles from one tank to the next, said transfer means including a vertically arranged endless movable conveyor, and pickup means connected to said conveyor means and adapted to be moved thereby to pick up an article from said lengthwise conveyor, to lift it vertically to a distance above said tanks, to move it forward and to lower it vertically upon the said lengthwise conveyor over the next tank, said pick up means including an elongated rod having one end mounted so as to move vertically only, having a portion so located as to pick up, forwardly move, and lower the articles, and having a pivotal connection to said vertically arranged conveyor, the mounting of the first mentioned end including a vertically slotted stationary guide member in which said end is disposed to move, said end being interlocked with said member.

11. In a device of the class described, a vertically arranged endless movable conveyor having a pickup rod pivotally connected thereto, at an intermediate point of the rod, a stationary guide member having a vertical slot therein in which one end of said pickup rod is disposed, said end being locked to said member so that its only movement is up and down in said slot the other end of the rod having a pickup fork.

ALBERT H. HANNON.